United States Patent

Murakami et al.

Patent Number: 5,106,920
Date of Patent: Apr. 21, 1992

[54] HYDROGENATED RING-OPENING POLYMER AND PROCESS FOR PRODUCING SAME

[75] Inventors: Toshihide Murakami, Yokohama; Teiji Kohara, Kawasaki; Tadao Natsuume, Yokosuka, all of Japan

[73] Assignee: Nippon Zeon Co., Ltd., Tokyo, Japan

[21] Appl. No.: 617,109

[22] Filed: Nov. 21, 1990

[30] Foreign Application Priority Data

Nov. 27, 1989 [JP] Japan .................................. 1-306830
Oct. 20, 1990 [JP] Japan .................................. 2-282951

[51] Int. Cl.$^5$ ........................ C08F 8/04; C08F 232/08
[52] U.S. Cl. .................................. 525/326.1; 526/280
[58] Field of Search ........................ 525/326.1

[56] References Cited

U.S. PATENT DOCUMENTS 2,130,800 9/1938 Holt .................................. 525/326.1

FOREIGN PATENT DOCUMENTS 4415666 7/1969 Japan .
60-26024 2/1985 Japan .
63-092625 4/1988 Japan .

Primary Examiner—Joseph L. Schofer
Assistant Examiner—Wu C. Cheng
Attorney, Agent, or Firm—Armstrong, Nikaido, Marmelstein, Kubovcik & Murray

[57] ABSTRACT

The present invention provides a hydrogenated polycyclic norbornene ring-opening polymer which is excellent in heat resistance, optical characteristics and processability which comprises recurring units represented by the following formula [I] and [II] or these recurring units substituted with alkyl in an amount of at least 10 mol % based on total polymer units and has an intrinsic viscosity [η] of 0.01–20 dl/g measured in toluene at 25° C., with at least 50% of C═C bonds which constitute main chain being single bonds:

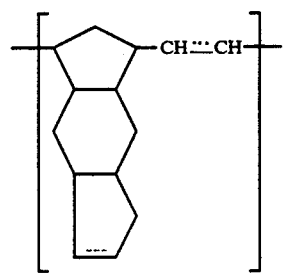

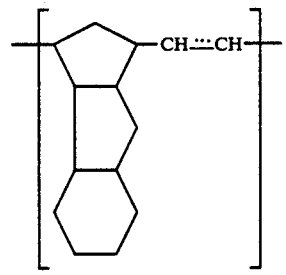

wherein —denotes a double bond or a single bond.

14 Claims, No Drawings

HYDROGENATED RING-OPENING POLYMER AND PROCESS FOR PRODUCING SAME

BACKGROUND OF THE INVENTION

Field of the Invention

The present invention relates to a novel hydrogenated ring-opening polymer excellent in heat resistance, optical characteristics and processability and in particular, to a hydrogenated polycyclic norbornene ring-opening polymer which is colorless and transparent, is small in birefringence, has sufficient strength and heat resistance and contains no gel and is suitable as optical materials and a process for production thereof.

Related Art

Hitherto, polymethyl methacrylate and polycarbonate have been used as optical polymer materials. However, the former has problems in water absorption and the latter has problems in that birefringence is apt to occur due to its basic structure having benzene ring and its high melt viscosity. Thus, it has become difficult to meet the advancing demands.

Recently, polymers comprising polycyclic norbornene monomers have been developed as polymer materials improved in the above defects.

For example, Japanese Patent Kokai Nos. 60-26024 and 1-132625 disclose that hydrogenation products of ring-opening polymers of unsubstituted or substituted tetracyclododecenes or ring-opening copolymers of the above tetracyclododecenes with other cycloolefins such as norbornenes are superior in transparency, water resistance and heat resistance. However, hydrogenation products of ring-opening polymers of tetracyclododecenes are not necessarily superior in processability and besides, have no such small birefringence value enough to sufficiently meet required properties.

Furthermore, Japanese Patent Kokoku No. 58-43412 discloses that hydrogenation products of dicyclopentadiene ring-opening polymer can be easily hot-melt processed and provides a transparent and tough sheet. However, this hydrogenation product has the defect that it has a glass transition temperature of about 95° C. and is insufficient in heat resistance to use as optical disc.

On the other hand, unhydrogenated polymers of polycyclic norbornene monomers are inferior in oxidative deterioration resistance and are unsuitable as optical materials.

Recently, it has been proposed to produce a molded product of crosslinked polymer in the following manner: That is, 3a,4,7,7a-tetrahydroindene (THI) having the following formula which is a by-product in production of vinylnorbornene by subjecting butadiene and cyclopentadiene to Diels-Alder reaction is further subjected to Diels-Alder reaction with cyclopentadiene to produce a addition product (TPA) of 1:1 and the resulting TPA is bulk polymerized by reaction injection (RIM) process in the presence of a metathesis polymerization catalyst (Japanese Patent Kokai No. 63-92625).

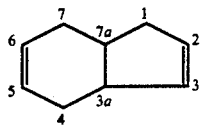

(THI)

TPA is a monomer which is available by a simple reaction using by-product, but bulk polymer of TPA prepared by RIM process is a corsslinked polymer and is not suitable as optical materials. Moreover, this TPA usually contains trimers of cyclopentadiene which are difficult to separate and since they are crosslinking monomers, ring-opening polymerization cannot be performed without causing gelation.

SUMMARY OF THE INVENTION

The object of the present invention is to provide a hydrogenated polycyclic norbornene ring-opening polymer which is colorless and transparent and small in birefringence, has sufficient strength and heat resistance and containing no gel and is suitable as optical materials.

According to the present invention, there can be provided a hydrogenated polycyclic norbornene ring-opening copolymer which is colorless and transparent, small in birefringence, has sufficient strength and heat resistance, contains no gel, and is suitable as optical materials.

As a result of intensive research conducted by the inventors in an attempt to develop novel synthetic resins suitable as optical polymers or starting materials therefor using polycyclic norbornene monomers, it has been found that a mixture of 5,8-methano-3a,4,4a,5,8,8a,9,9a-octahydro-1H-benzoindene (MBHI) and 1,4-methano-1,4,4a,4b,5,8,8a,9a-octahydro-9H-fluorene (MOHF) is a useful monomer.

MBHI and MOHF are obtained as mixture by subjecting THI and cyclopentadiene (CP) to Diels-Alder reaction to produce an addition product (TPA) of 1:1. However, as mentioned above, this TPA produced through Diels-Alder reaction contains CP trimers, specifically, compounds represented by the formulas [C] and [D] referred to hereinafter as by-products and hitherto, the TPA has been used as it is without removing the CP trimers because the CP trimers have boiling point close to that of TPA and have been considered to be difficult to separate them by distillation. (See page 3, right lower column of Japanese Patent Kokai No. 63-92625).

Among these CP trimers, especially the compound represented by the formula [D] is bifunctional compound in metathesis reaction and only crosslinked polymer containing gel can be obtained by ring-opening polymerization without removing the compound [D]. In the abovementioned Japanese Patent Kokai No. 63-9225, CP trimers need not be removed since it aims at obtaining crosslinked polymer molded product.

However, it is necessary to remove these CP trimers in order to obtain polymers containing no gel to be used for optical materials. The inventors have found that these CP trimers which have been considered to be difficult to separate can be sufficiently removed by rectification and further found that ring-opening polymers free from gel can be obtained by carrying out ring-opening polymerization with reducing content of CP trimers in Diels-Alder reaction product of THI and CP to 1% by weight or less, preferably 0.5% by weight or less, using a ring-opening polymerization catalyst, preferably a Ziegler catalyst comprising an organoaluminum compound, titanium tetrahalide and an amine activator and more preferably in the presence of a chain olefin as a molecular weight modifier. It has been further found that hydrogenation product of the resulting ring-opening polymer is colorless and transparent, is smaller in birefringence than conventional ones and has sufficient strength and heat resistance. Thus, the present invention has been accomplished.

DETAILED DESCRIPTION OF THE PREFERRED EMBODIMENTS

According to the present invention, the following hydrogenated polycyclic norbornene ring-opening polymers and a process for producing them are provided.

(1) Hydrogenated polycyclic norbornene ring-opening polymer which contains recurring units represented by the following formulas [I] and [II] or their alkyl-substituted units in an amount of at least 10 mol% of total polymer units, has an intrinsic viscosity [η] of 0.01-20 dl/g measured in toluene at 25° C., and contains at least 50% of single bonds based on (C—C) bonds which constitute main chain:

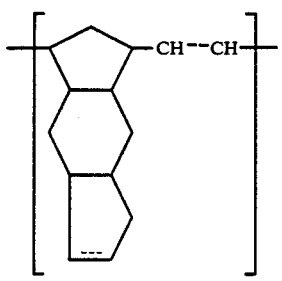

[I]

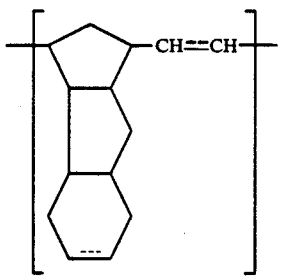

[II]

(wherein ==denotes a single bond or a double bond.).

(2) A process for producing a hydrogenated polycyclic norbornene ring-opening polymer, characterized by hydrogenating with hydrogen at least 50% of olefinic unsaturated groups contained in a polycyclic norbornene ring-opening polymer which contains recurring units represented by the following formulas [I'] and [II'] or their alkyl-substituted units in an amount of at least 10 mol% of the total polymer units and has an intrinsic viscosity [η]of 0.01-20 d/lg measured in toluene at 25° C.

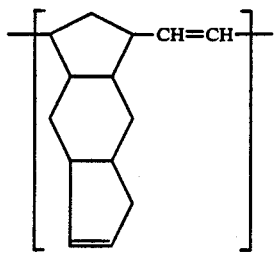

[I']

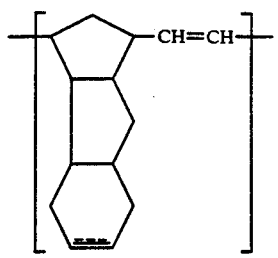

[II']

The present invention will be explained in detail.

Monomers

In the present invention, 5,8-methano-3a,4a, 5,8,8a,9-,9a-octahydro-1H-benzoindene (MBHI) and 1,4-methano-1,4,4a,4b,5,8,8a,9a-octahydro-9H-fluorene (MOHF) are used as monomers, if necessary, together with other norbornene monomers.

MBHI and MOHF which are monomers used in the present invention are norbornene monomers represented by the following formulas [A] and [B], respectively.

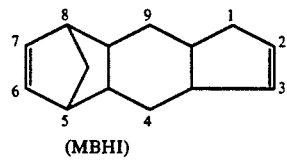

[A]

(MBHI)

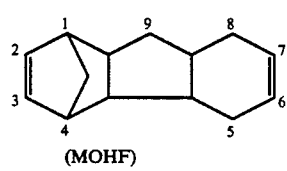

[B]

(MOHF)

The above MBHI and MOHF are obtained by subjecting 3a,4,7,7a-tetrahydroindene (THI) and cyclopentadiene (CP) to Diels-Alder reaction to produce an adduct (TPA) of 1:1. Separation of MBHI and MOHF is difficult since properties thereof such as boiling point are close to each other and TPA is obtained as a mixture thereof. Ratio of them in the mixture is usually 40-60 mol% of MBHI and 60-40 mol% of MOHF.

This TPA obtained through Diels-alder reaction contains CP trimers represented by the following formulas [C] and [D] as by-products and hitherto, the TPA has been used without removing them because they have boiling points close to that of TPA and are difficult to separate them by distillation.

[C]

(4,9:5,8-dimethano-3a,4,4a,5,8,8a,9,9a-octahydro-1H-benzoindene)

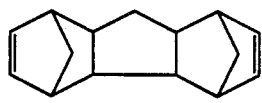

[D]

-continued
(1,4:5,8-dimethano-1,4,4a,4b,5,8,8a,9a-octahydro-9H-fluorene)

Of these CP trimers, especially the compound represented by the formula [D] is a bifunctional compound in metathesis reaction and only crosslinked polymers containing gel can be obtained when ring-polymerization is carried out without removing it.

Therefore, in the present invention, content of CP trimers in the addition product of 1:1 produced by Diels-Alder reaction of THI and CP is reduced to 1% by weight or less, preferably 0.5% by weight or less by rectification. If content of CP trimers is more than 1% by weight, the resulting ring-opening polymer contains gel and hydrogenation product thereof is unsuitable as optical materials.

By using such monomer mixture of MBHI and MOHF containing at most 1% by weight of CP trimers, a ring-opening polymer free from gel can be obtained even at a conversion of 90% or more, preferably 95% or more.

The above MBHI and MOHF are obtained as a mixture in Diels-Alder reaction of THI and CP. These MBHI and MOHF may be substituted with alkyls such as methyl, ethyl and propyl, but unsubstituted ones are preferred in view of their easy availability.

These MBHI and MOHF produce the above recurring units [I'] and [II'] by ring-opening polymerization, respectively and produce recurring units [I] and [II] by hydrogenation of the polymer, respectively.

In the present invention, only the monomer mixture of MBHI and MOHF may be used, but it may be copolymerized with known norbornene monomers. The copolymerizable monomers include, for example, norbornene compounds represented by the following formulas [E], [F] and [G] or substituted compounds thereof. Furthermore, polycyclic norbornenes having 5 or more rings such as asymmetric trimers of cyclopentadiene, hexacycloheptadecene and substituted product thereof may be used in combination with the above compounds.

The compound represented by the formula [E] is tetracyclododecene (TCD), which may have substituent such as lower alkyl group, e.g., methyl, ethyl and propyl, and other known substituents such as alkylidene group, aryl group, cyano group, halogen atom, alkoxycarbonyl group and pyridyl group. Besides, the compound may have one or more substituents. These TCD(s) can be obtained by subjecting cyclopentadienes and norbornenes to Diels-Alder reaction and separating it from the reaction mixture by distillation and the like.

[E]

TCD(s) form the following recurring unit [III'] by ring-opening polymerization and further form the following recurring unit [III] by hydrogenation.

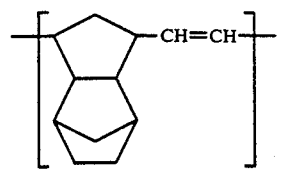

[III']

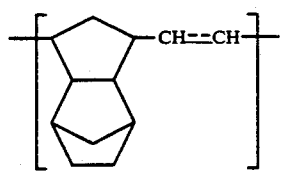

[III]

(wherein ═ denotes a single bond or a double bond).

The compound represented by the formula [F] is dicyclopentadiene (DCP), which may have substituent such as alkyl groups, e.g., methyl, ethyl, propyl, and butyl.

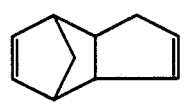

[F]

DCP(s) form recurring unit [IV'] by ringopening polymerization and form recurring unit [IV] by hydrogenation.

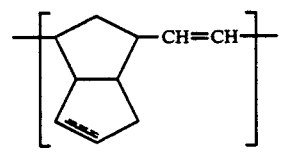

[IV']

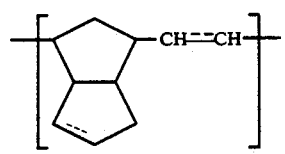

[IV]

The compound represented by the formula [G] is 2-norbornene (NB), which may have substituent.

The substituents are the same as in the compound represented by the formula [E] and substituted norbornenes include, for example, alkyl-substituted norbornenes such as 5-methyl-2-norbornene, 5,6-dimethyl-2-norbornene, 5-ethyl-2-norbornene and 5-butyl-2-norbornene, alkylidene-substituted norbornenes such as 5-ethylidene-2-norbornene, and polar group-containing norbornenes such as 5-phenyl-2-norbornene, 5-cyano-2-norbornene, 5-chloro-2-norbornene, and 5-methoxycarbonyl-2-norbornene.

[G]

NB(s) form recurring unit [V'] by ring-opening polymerization and form recurring unit [V] by further hydrogenation.

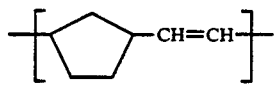

[V']

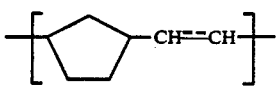

[V]

Among the above compounds, preferred are nonpolar ones, namely, unsubstituted compound and alkyl- or alkylidene-substituted compounds from the point of water resistance.

By using MBHI and MOHF as monomers, molded products of less optical distortion even in high glass transition temperature region can be obtained and besides they are excellent in birefringence.

Other norbornene monomers are used in combination with the above monomers for improvement of processability and modification. On the other hand, when the other norbornene monomers are used as main components, a mixture of MBHI and MOHF is used for the purpose of improving birefringence or controlling glass transition temperature.

In the case of using other monomers in combination, with increase of amount of TCD(s) [E], glass transition temperature of molded product increases, but when the glass transition temperature is too high, processability deteriorates and besides birefringence value which is regarded to be important in optical characteristics becomes inferior. When amount of DCP(s) [F] or NB(s) [G] increases, glass transition temperature does not increase enough and nevertheless, effect to improve birefringence value is low.

Therefore, considering processability, glass transition temperature (heat resistance) and birefringence, it is necessary to properly select amount of these other norbornene monomers. For example, when DCP(s) or NB(s) are used in combination, amount thereof is preferably within the range where glass transition temperature is 110° C. or higher and when TCD(s) are used, these are preferably used in an amount in which birefringence value is not damaged. From such viewpoint, amount of other norbornene monomers is 90 mol% or less, preferably 70 mol% or less and most preferably 50 mol% or less. Other norbornene monomers are used singly or in combination of two or more of them.

In order to obtain polymers having a glass transition temperature of 130° C. or higher and excellent in birefringence, it is appropriate to copolymerize TCD(s) in an amount of 20-50 mol%.

As far as the advantageous effects of the present invention are not substantially damaged, other cycloolefins capable of being ring-opening polymerized may also be used. Examples of such cycloolefins are compounds having one reactive double bond such as cyclopentene, cyclooctene, and 5,6-dihydrodicyclopentadiene.

Polycyclic norbornene monomers include compounds having two or more reactive double bonds and these compounds are apt to bring about gelation of polymer and so these compounds are desirably removed as much as possible.

Furthermore, in polymerization it is preferred to add chain monoolefins or chain non-conjugated diolefins such as butene-1, pentene-1, hexene-1, octene-1, butene-2, pentene-2, and 1,4-hexadiene in an amount of about mol% or less, preferably 0.01-5 mol%, most preferably 0.2-3 mol% for modification of molecular weight. Among these molecular weight modifiers, especially preferred are 1-olefins such as butene-1, pentene-1, hexene-1, and octene-1.

Polymerization catalysts

Ring-opening copolymers of these monomers are produced by usual ring-opening polymerization process of norbornenes and polymerization catalysts used are not critical and include, for example, compounds of platinum group metals such as ruthenium, rhodium, palladium, osmium, iridium, and platinum (e.g., Japanese Patent Kokoku No. 46-14910), compounds of transition metals such as titanium, vanadium, molybdenum, and tungsten, and organometallic compounds of metals of Groups I-IV of the periodic table and furthermore, third components such as tertiary amines may be added to these catalyst systems (e.g., Japanese Patent Kokoku Nos. 41-20111, 57-17883, and 57-61044, and Japanese Patent Kokai Nos. 54-86600 and 58-127728).

Among them, especially preferred are catalyst systems containing a transition metal compound such as titanium tetrahalide and an organometallic compound such as organoaluminum compound to which a third component such as aliphatic or aromatic tertiary amine is added.

Examples of polymerization catalysts are shown below.

Transition metal compounds

As metal compounds, compounds of transition metals such as titanium, vanadium, tungsten, and molybdenum are preferred and examples are halides, oxyhalides, oxides, carbonyl compounds and organic ammonium salts;. of these transition metals.

Typical examples of the compounds are as follows:
$TiCl_4$, $TiBr_4$, $VOCl_3$, $VOBr_3$, $WBr_2$, $WBr_4$,
$WBr_6$, $WCl_2$, $WCl_4$, $WCl_5$, $WCl_6$, $WF_4$, $WI_2$,
$WI_4$, $WOBr_4$, $WOCl_4$, $WOF_4$, $MoBr_2$, $MoBr_3$,
$MoBr_4$, $MoCl_4$, $MoCl_5$, $MoF_4$, $MoOCl_4$,
$MoOF_4$, $WO_2$, $H_2WO_4$, $NaWO_4$, $K_2WO_4$, $(NH_4)_2WO_4$,
$CaWo_4$, $CuWo_4$, $MgWO_4$, $(CO)_5WC(OCH_3)(CH_3)$, $(CO)_5WC(OC_2H_5(CH_3))$, $(CO)_5WC(OC_2H_5)(C_4H_5)$, $(CO)_5MoC(OC_2(CH_3)$, $(CO)_5Mo=C(OC_2H_5)$ $(N(C_2H_5)_2)$, tridecylammonium molybdate, and tridecylammonium tungstate.

Organometallic compounds

Organometallic compounds include, for example, organometallic compounds of metals of Groups I-IV of the periodic table, such as organoaluminum compounds, organotin compounds, and compounds of lithium, sodium, magnesium, zinc, cadmium and boron.

Organoaluminum compounds include, for example, trimethylaluminum, triethylaluminum, tri-n-propylaluminum, triisopropylaluminum, triisobutylaluminum, trihexylaluminum, trioctylaluminum, triphenylaluminum, tribenzylaluminum, diethylaluminum monochloride, di-n-propylaluminum monochloride, diisobutylaluminum monochloride, di-n-butylaluminum monochloride, diethylaluminum monobromide, diethylaluminum monoiodide, diethylaluminum monohydride, di-n-propylaluminum monohydride, diisobutylaluminum monohydride, methylaluminum sesquichloride, ethylaluminum sesquibromide, isobutylaluminum sesquichloride, ethylaluminum dichloride, ethylaluminum dibromide, propylaluminum dichloride, isobutylaluminum dichloride, propylaluminum dibromide, and ethylaluminum diiodie.

Organotin compounds include, for example, tetremethyltin, diethyldimethyltin, tetraethyltin, dibutyldiethyltin, tetrabutyltin, tetraisocumyltin, tetraphenyltin, triethyltin fluoride, triethyltin chloride, triethyltin bromide, triethyltin iodide, diethyltin difluoride, diethyltin dichloride, diethyltin bromide, diethyltin diiodide, ethyltin trifluoride, ethyltin trichloride, ethyltin tribromide, and ethyltin triiodide. Other examples of organometallic compounds are n-butyl lithium, n-pentylsodium, methylmagnesium iodide, ethylmagnesium bromide, methylmagnesium bromide, n-propylmagnesium chloride, t-butylmagnesium chloride, allylmagnesium chloride, diethylzinc, diethylcadmium, trimethylboron, triethylboron, and tri-n-butylboron.

Third component

Polymerization activity can be enhanced and selectivity of ring-opening polymerization can be improved by adding a third component to the above catalyst system. As examples of the third component, mention may be made of molecular oxygen, alcohols, ethers, peroxides, carboxylic acids, acid anhydrides, acid chlorides, esters, ketones, nitrogen-containing compounds, sulfur-containing compounds, halogen-containing compounds, molecular iodine, and Lewis acids. Among them, aliphatic or aromatic tertiary amines are preferred and examples thereof are triethylamine, dimethylaniline, tri-n-butylamine, pyridine, and α-picoline.

Solvent

Polymerization of ring-opening copolymer used in the present invention can be carried out without using solvent, but can also be carried out in an inert organic solvent.

Examples thereof are aromatic hydrocarbons such as benzene, toluene, and xylene, aliphatic hydrocarbons such as n-pentane, hexane and heptane, alicyclic hydrocarbons such as cyclohexane, and halogenated hydrocarbons such as methylene dichloride, dichloroethane, dichloroethylene, tetrachloroethane, chlorobenzene, dichlorobenzene, and trichlorobenzene. These may be used singly or in combination of two or more.

Polymerization temperature

Temperature condition for ring-opening pplymerization is not critical, but usually an optical temperature is selected from $-20°$ C.$-100°$ C., preferably $10-50°$ C.

Polymerization pressure

Polymerization pressure is preferably selected from $0-50$ kg/cm$^2$.

Hydrogenation

The hydrogenated ring-opening copolymer of the present invention can be obtained by hydrogenating the ring-opening copolymer to saturate a part or all of olefinic unsaturated groups (double bonds in the main chain and in unsaturated ring) and thus, heat deterioration resistance and light deterioration resistance of the polymer can further be improved. Hydrogenation rate can theoretically be 0–100% in case that when all double bonds in the ring-opening polymer are saturated by hydrogenation, the hydrogenation rate is regarded to be 100%, and actually it can be optionally selected within the above range. However, in order to improve heat deterioration resistance and light deterioration resistance, it is necessary that at least 50% of double bonds in the main chain are hydrogenated to single bonds.

The hydrogenation reaction of the ring-opening copolymer is carried out by usual process. As hydrogenation catalysts, those which are generally used for hydrogenation of olefin compounds can be used and have no special limitation. Examples thereof are shown below.

As heterogeneous catalysts, mention may be made of solid catalysts such as nickel, palladium, and platinum, and these metals supported on carriers such as carbon, silica, diatomaceous earth, alumina, and titanium oxide, for example, nickel/silica, nickel/ diatomaceous earth, palladium/carbon, palladium/silica, palladium/diatomaceous earth, and palladium/alumina. As homogenous catalysts, mention may be made of those which have a substrate of a metal belonging to Group VIII of the periodic table, for example, those which comprise Ni or Co compound and an organometallic compound of metal belonging to Groups I-III of the periodic table such as nickel naphthenate/triethylaluminum, cobalt octenate/n-butyllithium, and nickel acetylacetonate/triethylaluminum. Further examples are Rh compounds.

Hydrogenation reaction is carried out in homogeneous or heterogeneous system depending on the kind of catalyst and under a hydrogen pressure of 1–150 atm and at $0°–180°$ C., preferably $20°–100°$ C. Hydrogenation rate can be optionally adjusted by changing hydrogen pressure, reaction temperature, reaction time, concentration of catalyst or the like, but in order that the hydrogenated product has excellent heat deterioration resistance and light deterioration resistance, at least 50% of double bonds in the main chain in the polymer must be hydrogenated, and preferred hydrogenation rate is at least 80%, more preferred hydrogenation rate is at least 90%.

Hydrogenated ring-opening copolymer

Ring-opening copolymer used in the present invention has an intrinsic viscosity [η] of 0.01–20 dl/g, preferably 0.1–10 dl/g measured in toluene at 25° C., and [η]]of the hydrogenated ring-opening copolymer of the present invention is also 0.01–20 dl/g, preferably 0.1–10 dl/g.

When [η] is within the above range, heat resistance, water resistance, transparency, chemical resistance, solvent resistance, processability and mechanical properties are satisfactory.

Hydrogenated ring-opening polymer obtained by hydrogenating a ring-opening copolymer of TCD(s) and NB(s) has a relatively high glass transition temperature and excellent in heat resistance, but has the problem that birefringence value is not necessarily satisfactory. On the other hand, the hydrogenated ring-opening copolymer of the present invention can be properly controlled in its glass transition temperature to balance heat resistance and processability and besides, is superior in birefringence and the molded product is less in optical distortion even in the high glass transition temperature region.

Specifically, the hydrogenation product of the present invention can be suitably controlled in its glass transition temperature (Tg) within the range of about 110° C.–about 180° C., preferably 120° C.–160° C.

Besides, the hydrogenation product is highly balanced in light transmission, water resistance, chemical resistance, solvent resistance, and mechanical properties and is especially suitable as optical materials.

In addition, the hydrogenated ring-opening polymer is further improved in heat deterioration resistance and light deterioration resistance as compared with the ring-opening copolymer used.

The hydrogenated ring-opening copolymer of the present invention can be molded by various known methods. Furthermore, in molding operation, there may be added various additives such as inorganic and organic fillers, stabilizers, antistatic agents, and lubricants.

As is clear from the facts that the hydrogenated ring-opening copolymer of the present invention is high in glass transition temperature and its unsaturated groups are hydrogenated, the hydrogenated copolymer is such polymer as being excellent in heat deterioration resistance and light deterioration resistance and in optical properties and being balanced in transparency, chemical resistance, and mechanical properties and hence is useful as various molded products in a wide variety of fields.

For example, the hydrogenated polymer of the present invention can be utilized in optical fields such as optical lens, optical disc, optical fiber, and glass window, electrical fields such as water tank in electric iron, electronic range, substrate for liquid crystal display, printed substrate, high-frequency circuit substrate, and transparent electroconductive sheet and film, medical and chemical fields such as injector, pipet, and animal gauge, and other various fields such as various instruments, housing, film, sheet and helmet.

The present invention will be explained in detail by the following nonlimiting examples and comparative examples, where parts are by weight unless otherwise notified.

SYNTHESIS EXAMPLE

An equimolar mixture of 3a,4,7,7a-tetrahydroindene of 99% or higher in purity and cyclopentadiene was subjected to Diels-Alder reaction in an autoclave at 230° C. The reaction mixture was recovered and distilled to obtain a mixture X of MOHF and MBHI containing 40% of cyclopentadiene trimer (CP trimer).

Analysis of the mixture X by gas chromatography showed that proportion of MOHF and MBHI was nearly equimolar and 15% of the CP trimer was 1,4:5,8-dimethano-1,4,4a,4b,5,8,8a,9a-octahydro-9H-fluorene (compound of the formula [D]).

The mixture X was further rectified to obtain a fraction of 101°–105° C. (mixture Y) and a fraction of 105°–109° C. (mixture Z) under the conditions of 2 mmHg and a reflux ratio of 1/20.

Analysis by gas chromatography showed that content of CP trimer was 0.5% in mixture Y and 5% in mixture Z.

EXAMPLE 1

60 parts of mixture Y (CP trimer content 0.5%) obtained in Synthesis Example was dissolved in 200 parts of cyclohexanone and one part of hexene-1 was added thereto as a molecular weight modifier. To the resulting solution were added 10 parts of 15% solution of triethylaluminum in cyclohexane, 5 parts of triethylamine and 10 parts of 20% solution of titanium tetrachloride in cyclohexane and ring-opening polymerization was started at 30° C.

After 30 minutes from starting of polymerization, 10 parts of 5% solution of tungsten hexachloride in cyclohexane was added at the point of a conversion rate of 85%, followed by stirring for further 30 minutes. Then, 5 parts of methanol was added to stop the reaction. Thereafter, the reaction mixture was poured into acetone/isopropyl alcohol (1/1) to precipitate polymer, followed by filtration. Conversion rate (Yield) was 97%.

The resulting polymer was again dissolved in 300 parts of cyclohexane and 1 part of palladium-carbon catalyst was added thereto and the solution was charged in an autoclave. After mixing by stirring, the air in the autoclave was replaced with hydrogen and the content was kept for 30 minutes under a hydrogen pressure of 150 kg/cm$^2$ G and at a temperature of 30° C. with stirring. Then, temperature was elevated to 180° C. and reaction was allowed to proceed for 3 hours. After completion of the reaction, the resulting hydrogenated polymer solution was filtrated to remove catalyst and was poured into acetone/isopropyl alcohol (1:1 by volume) to coagulate it and precipitate was collected by filtration and dried to obtain 54 parts of hydrogenated polymer.

As a result of analysis of this polymer by proton NMR spectrum, it was confirmed that absorption of proton resulting from double bond disappeared and nearly complete hydrogenation was attained (hydrogenation rate 100%).

This hydrogenated polymer had an intrinsic viscosity of 0.6 dl/g measured in toluene at 25° C. Glass transition temperature of the hydrogenated polymer measured by DSC analysis was 118° C.

This hydrogenated polymer was molded to a plate of 1.2 mm thick by hot pressing and properties of the plate was measured to obtain a light transmittance of 90% or higher at 400 nm and a birefringence smaller than that of conventional polymer. Further, the plate did not soften even when this was heated to 130° C. A tough film was obtained by casting the polymer using toluene solvent and this film had a sufficient strength. Water absorption was 0.1% or less. Solvent resistance was evaluated by dipping the above plate in ethyl acetate and acetone at room temperature for 20 hours and observing change in appearance. Chemical resistance was evaluated by dipping the plate in 97.6% sulfuric acid and 28% aqueous ammonia at room temperature for 20 hours and observing change in appearance. As a result, no change in appearance was recognized in both the cases.

From the above results, it can be seen that the hydrogenated ring-opening copolymer of the present invention is excellent in heat resistance and optical properties and are good in properties such as water resistance.

COMPARATIVE EXAMPLE 1

In the same manner as in Example 1, ring-opening polymerization was carried out using mixture X (CP trimer content 40%) and mixture Z (CP trimer content 5% obtained in the above Synthesis Example, but mixture X gelled in 10 minutes after starting of reaction and mixture Z gelled after addition of tungsten hexachloride. Thus, in both the cases, only polymers which were not suitable as optical materials were obtained.

EXAMPLE 2

100 parts of the hydrogenated polymer obtained in Example 1 was again dissolved in 600 parts of cyclohexane and the solution was poured into 2400 parts of acetone/isopropyl alcohol (1:1 by volume) and precipitate was collected by filtration and dried to obtain 94 parts of hydrogenated polymer.

This hydrogenated polymer had an intrinsic viscosity of 0.6 dl/g measured in toluene at 25° C.

Furthermore, molecular weight (in terms of polystyrene) of the polymer was measured by high performance liquid chromatography using toluene as a solvent [measured by HLC 802L manufactured by Toso Co., Ltd., at a temperature of 38° C. and a flow rate of 1.0 ml/min using TSK gel G5000H-G4000H as column]to obtain Mn: $3.4 \times 10^4$, Mw: $9.3 \times 10^4$, and molecular weight distribution Mw/Mn: 2.7.

Glass transition temperature of the hydrogenated polymer measured by DSC analysis was 128° C.

This hydrogenated polymer was molded into a plate of 1.2 mm thick by hot pressing and properties of this plate were measured. Light transmittance was 90% at 400 nm and 91% at 830 nm.

EXAMPLE 3

Polymerization was carried out by a method of continuously adding monomers and one component of polymerization catalyst to polymerization system for the purpose of improving processability of optical disc by reducing molecular weight distribution.

In a 1000 liter reactor were charged 330 parts of dehydrated toluene, 2.3 parts of triethylaluminum, 4.7 parts of triethylamine, and 0.70 part of 1-hexene under nitrogen atmosphere. With keeping temperature at 20° C, 140 parts of mixture Y and 0.80 part of titanium tetrachloride were continuously added to the reaction system over a period of 1 hour to allow polymerization reaction to proceed. The reaction was stopped by adding a mixed solution of isopropyl alcohol/aqueous ammonia (0.5 part/0.5 part) and then the reaction mixture was poured into 1500 parts of isopropyl alcohol to coagulate it. The precipitate was collected by filtration and vacuum dried at 70° C. and under 5 torr for 24 hours to obtain 121 parts of a ring-opening polymer (yield 86%).

The resulting ring-opening polymer was dissolved in 600 parts of cyclohexane and 2.4 parts of palladium/carbon catalyst (supporting amount: 5%) was added to the solution in a 2000 liter reactor and hydrogenation reaction was allowed to proceed for 5 hours at 140° C. under a hydrogen pressure of 70 kg/cm². The hydrogenation product was filtrated to remove hydrogenation catalyst and was poured into 1600 parts of isopropyl alcohol to make coagulation. The precipitate was collected by filtration, vacuum dried at 70° C. and under 5 Torr for 24 hours, and then again dissolved in 600 parts of cyclohexane. The solution was poured into 1660 parts of isopropyl alcohol and was again coagulated. The precipitate was collected by filtration and vacuum dried at 70° C. and under 5 torr for 24 hours and successively at 110° C. for 24 hours to obtain 113 parts of a hydrogenated polymer.

This polymer had a hydrogenation rate of nearly 100%, an intrinsic viscosity of 0.41 dl/g, a molecular weight of Mn: $2.8 \times 10^4$ and Mw: $6.2 \times 10^4$, a molecular weight distribution Mw/Mn of 2.2, and a glass transition temperature of 128° C.

To 10 parts of this hydrogenated polymer was added 0.01 part of tetrakis[methylene-3-(3,5-tert-butyl-4-hydroxyphenyl) propionate]methane as an antioxidant and this polymer was melt kneaded by a twin-screw extruder having a screw of 30 mmφ (TEM-30 manufactured by Toshiba Machine Co., Ltd.) at 250° C. to make pellets. The pellets were molded into an optical disc substrate of 130 mm in diameter and 1.25 mm in thickness by an injection molding machine (DISC-5 manufactured by Sumitomo Heavy Industries, Ltd.) at a resin temperature of 330° C. and a mold temperature of 100° C.

No defects such as coloration, silver streaks and microvoids were found in visual examination of appearance in the resulting optical disc substrate and this substrate was satisfactory. Properties of the substrate were measured and light transmittance was 88% at 400 nm and 91% at 830 nm and birefringence (radius: 25–60 nm) was 18 nm or less.

EXAMPLES 4–7

Hydrogenated ring-opening polymers were obtained by carrying out polymerization, hydrogenation, coagulation and drying in the same manner as in Example 3 except that mixture Y and 6-ethyl-1,4:5,8-dimethano-1,4,4a,5,6,7,8,8a-octahydronaphthalene (ETD), dicyclopentadiene (DCP) or norbornene (NB) were used in place of mixture Y as monomers and compositions of the monomers were as shown in Table 1. In the same manner as in Example 3, antioxidant was added to the polymers and optical disc substrates were molded therefrom and properties thereof were measured. The results are shown in Table 1.

COMPARATIVE EXAMPLE 2

Example 3 was repeated except that ETD was used as monomer. The results are shown in Table 1.

TABLE 1

| | Monomers | | | | | | Evaluation of optical disc substrate | |
|---|---|---|---|---|---|---|---|---|
| | Name | Composition (Weight ratio) | Mn × $10^4$ | Mw × $10^4$ | Mw/Mn | Tg (°C.) | Appearance | Birefringence (nm) |
| Example | | | | | | | | |
| 3 | Y | — | 2.8 | 6.2 | 2.2 | 128 | No change | ≦18 |
| 4 | Y/ETD | 80/20 | 2.9 | 6.3 | 2.2 | 130 | No change | ≦15 |
| 5 | Y/ETD | 65/35 | 3.1 | 6.2 | 2.0 | 132 | No change | ≦11 |
| 6 | Y/DCP | 90/10 | 2.8 | 6.0 | 2.1 | 125 | No change | ≦14 |
| 7 | Y/NB | 95/5 | 2.7 | 6.0 | 2.2 | 123 | No change | ≦16 |
| Comparative Example | | | | | | | | |
| 2 | ETD | — | 2.9 | 6.2 | 2.1 | 141 | No change | ≦20 |

What is claimed is:

1. A gel-free hydrogenated polycyclic norbornene ring-opening polymer having recurring units represented by the following formulas [I] and [II] or these recurring units substituted with alkyl in an amount of at least 10 mol% based on total polymer units, an intrinsic viscosity [η] of 0.01–20 dl/g measured in toluene at 25°

C., and at least 50% of C—C bonds which constitute main chain are single bonds:

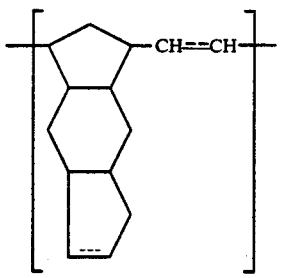 [I]

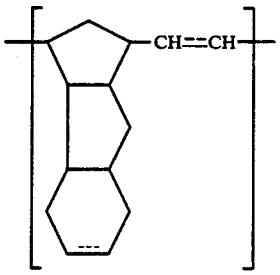 [II]

wherein ═ denotes a double bond or a single bond.

2. A gel-free hydrogenated polymer according to claim 1, which consists essentially of recurring units represented by the formulas [I] and [II].

3. A gel-free hydrogenated polymer according to claim 1, which contains hydrogenated product of polymer unit of other norbornene monomer.

4. A gel-free hydrogenated polymer according to claim 3, wherein the hydrogenation product of polymer unit of other norbornene monomer is represented by the following formula [III], [IV] or [V]:

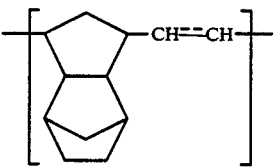 [III]

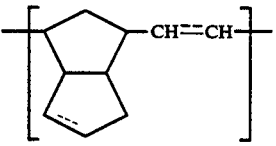 [IV]

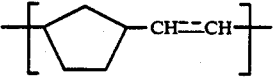 [V]

wherein ═ denotes the same meaning as mentioned above.

5. A gel-free hydrogenated polymer according to claim 3, wherein amount of the units [I] and [II] in total polymer units is 30 mol% or more.

6. A gel-free hydrogenated polymer according to claim 3, wherein amount of the units [I] and [II] in the total polymer units is 50 mol% or more.

7. A gel-free hydrogenated polymer according to claim 1, wherein hydrogenation rate of double bond is 80% or more.

8. A gel-free hydrogenated polymer according to claim 1, wherein hydrogenation rate of double bond is 90% or more.

9. A gel-free hydrogenated polymer according to claim 1, which has a glass transition temperature Tg of about 110° C.–about 180° C.

10. A gel-free hydrogenated polymer according to claim 1, which has a glass transition temperature Tg of 130° C. or higher.

11. A gel-free hydrogenated polymer according to claim 10 which comprises recurring units [I], [II] and [III].

12. A gel-free hydrogenated polymer according to claim 11, wherein the unit [III] is unsubstituted or lower hydrocarbon substituted unit.

13. A process for producing a hydrogenated norbornene ring-opening polymer which contains recurring units represented by the following formulas [I] and [II] or these units substituted with alkyl in an amount of at least 10 mol% based on the total polymer units and has an intrinsic viscosity [$\eta$] of 0.01–20 dl/g measured in toluene at 25° C., at least 50% of olefinic unsaturated group contained in the polymer being hydrogenated:

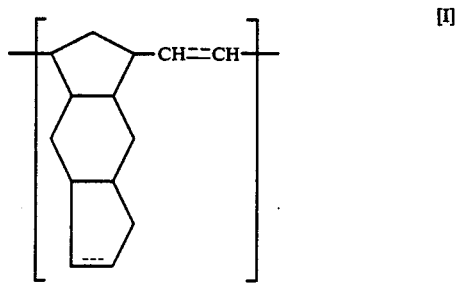 [I]

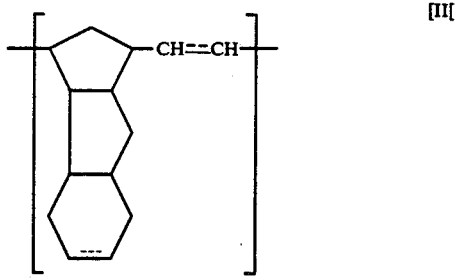 [II]

wherein ═ denotes a double bond or a single bond, which comprises the steps of:

(1) subjecting 3a,4,7,7a-tetrahydroindene and cyclopentadiene to Diels-Alder reaction,
(2) reducing content of cyclopentadiene trimer in the resulting polymer to 1% by weight or less,
(3) carrying out ring-opening polymerization, if necessary, with addition of comonomer to obtain a polymer comprising recurring units represented by the formulas [I'] and [II'] or these units substituted with alkyl:

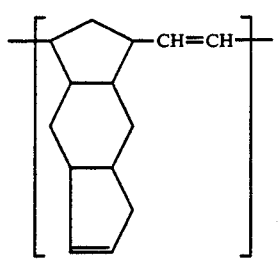
[I']
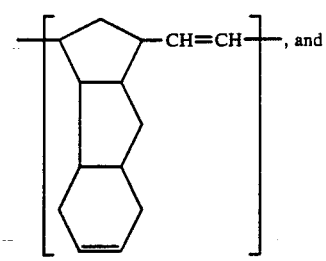, and [II']
(4) hydrogenating the polymer.
14. A process according to claim 13, wherein content of the cyclopentadiene trimer is reduced to 0.5% or less.
* * * * *